US005097189A

United States Patent [19]

Ito et al.

[11] Patent Number: 5,097,189

[45] Date of Patent: Mar. 17, 1992

[54] RECORDING APPARATUS

[75] Inventors: Noriaki Ito, Yokohama; Akira Torisawa, Machida, both of Japan

[73] Assignee: Canon Kabushiki Kaisha, Tokyo, Japan

[21] Appl. No.: 551,796

[22] Filed: Jul. 12, 1990

[51] Int. Cl.[5] .............. G05B 19/40

[52] U.S. Cl. .............. 318/685; 318/696; 400/903; 400/279

[58] Field of Search .............. 318/685, 696; 400/903, 400/279

[56] References Cited

U.S. PATENT DOCUMENTS

| | | | |
|---|---|---|---|
| 4,459,675 | 7/1984 | Bateson et al. | 364/519 |
| 4,794,292 | 12/1988 | Torisawa | 310/257 |
| 4,869,610 | 9/1989 | Nishizawa | 400/322 |
| 4,904,917 | 2/1990 | Hakluytt | 318/696 |
| 4,928,050 | 5/1990 | Torisawa et al. | 318/696 |
| 4,963,808 | 10/1990 | Torisawa et al. | 318/685 |
| 4,972,109 | 11/1990 | Kakizaki et al. | 310/49 A |
| 5,029,264 | 7/1991 | Ito et al. | 318/685 |

FOREIGN PATENT DOCUMENTS

| | | |
|---|---|---|
| 0313046 | 4/1989 | European Pat. Off. . |
| 2627312 | 8/1989 | France . |
| 62-193548 | 8/1987 | Japan . |
| 62-193549 | 8/1987 | Japan . |
| 2181908 | 4/1987 | United Kingdom . |

*Primary Examiner*—Bernard Roskoski
*Assistant Examiner*—Saul M. Bergmann
*Attorney, Agent, or Firm*—Fitzpatrick, Cella, Harper & Scinto

[57] ABSTRACT

A recording apparatus in which a stepping motor is used as a driving source to reciprocate a carriage on which a recording head is mounted and recording is executed by the recording head in accordance with the timing when the stepping motor rotates. The apparatus includes a rotational position detector to detect a rotational position of the stepping motor; a current switching circuit to switch energization currents to the stepping motor on the basis of a detection signal from the rotational position detector; a motor speed control circuit to closed loop control a rotational speed of the stepping motor through the current switching circuit; and a controller for detecting a load corresponding to the stepping motor by a speed control output from the motor speed control circuit and for controlling the motor so as to change output torque of the stepping motor in accordance with the load.

5 Claims, 8 Drawing Sheets

RECORDING APPARATUS

BACKGROUND OF THE INVENTION

1. Field of the Invention

The present invention relates to a recording apparatus and, more particularly, to a serial type recording apparatus in which a stepping motor is used as a driving source for effecting at least the movement for the recording and scanning of a recording head.

2. Description of a Prior Art

Generally, in the serial type recording apparatus, a stepping motor or a brushless motor of the hybrid type or the PN (permanent magnet) type is frequently used as a motor to drive a carriage for conveying a recording head in order to record and scan.

For instance, in a brushless motor, for example, a Hall element is ordinarily used to detect the position of the magnetic pole of a rotor to control a current supply to the motor. An optical or magnetical type encoder is used to detect the speed of the rotor.

However, such a brushless motor has the following problems.

(1) It is necessary to match the positions of the stator magnetic pole and the Hall element.

(2) If the current supply is switched by the Hall element, since the positions of the Hall element and the stator are unconditionally determined, the current supplying method of the motor is fixed. For instance, in the cases where what is called a 180° current supply control is executed and where what is called a 90° current supply control is performed, the positions of the Hall element for the position of the magnetic pole of the stator electrically differ by 45°. Therefore, in order to execute two kinds of current supply controls by using a single motor, the number of Hall elements must be doubled and the Hall elements must be arranged at positions suitable for the current supply controls, respectively.

For example, stepping motors in which the current supply control is controlled by using an output of an encoder have been proposed in JP-A-62-193548 and JP-A-62-193549. However, only a motor structure in which an encoder is arranged at a predetermined position is disclosed in the above citations and none of the drive control circuit and method of the motor and the like is disclosed.

Therefore, in U.S. Pat. No. 4,963,808, there has been proposed a control apparatus of a stepping motor, in which an encoder, having portions to be detected of the number which is an integer times as large as the number of magnetic poles of a rotor is fixed to the shaft of the rotor. The number of portions to be detected of the encoder in association with the rotation of the rotor is counted at a predetermined position on the stator side, and a current supply to a coil of the stator is switched when the count value coincides with a predetermined value. That is, the driving of the stepping motor is controlled by a closed loop.

Conventionally, the drive control for the stepping motor has been performed by an open loop control treating the number of driving pulses of the stepping motor and the frequency of such pulse.

In the case where such a conventional stepping motor which is driven by the open loop control is used as a carriage driving motor, when the carriage is driven and run, particularly, in the case of the hybrid type motor, an annoying noise like "kee—n" which is caused by the vibration of the rotor of the stepping motor is generated. On the other hand, when the carriage is started, stopped, and reversed, that is, when the stepping motor is started, stopped, and reversed, the stepping motor is started or stopped while vibrating, so that a large noise like "Gatan" is generated. The above noises cause a problem in a printer which hardly generates noises such as an ink jet printer, particularly, like a bubble jet printer or the like.

On the other hand, although the use of the above brushless motor as a carriage driving motor is also considered, in the case of the brushless motor, the rising time upon actuation is long and it is not suitable as a carriage driving motor in which the start, stop, reversal, and start of the motor are repeated for almost every line. In the case of using the brushless motor, high-speed recording cannot be performed.

Therefore, in U.S. Pat. No. 4,928,050, there has been proposed a recording apparatus in which a stepping motor is used as a driving source and the recording head is moved to record and scan, wherein the recording apparatus comprises: detecting means for detecting a rotational angle position of a rotor of the stepping motor; and control means for closed loop controlling the driving of the stepping motor in accordance with the result of the detection of the detecting means.

In the closed loop control of the stepping motor, an encoder is attached to the rotary shaft of the stepping motor, an output signal of the encoder is counted, the rotational position is detected, and a motor energization signal is switched when the count value coincides with a predetermined count value, thereby controlling the rotation of the stepping motor.

As mentioned above, in the case of driving the stepping motor by the closed loop control, it is necessary to execute the speed control and the position control in order to improve the recording accuracy. When the printer is designed, it is necessary to determine a control gain and a phase as parameters for the speed and position controls in consideration of the stability of the carriage speed, the response speed of the stepping operation, and the like.

In the recording apparatus in which the carriage is driven by the stepping motor which is controlled in a closed loop, if a load torque which is applied to the carriage motor increases due to an environmental change or a change due to aging of the system, the objective values of the rising time to actuate the carriage, driving speed, speed change amount, and the like cannot be satisfied as a result, the carriage stops in the worst case.

The load torque increases in the following cases. For instance, in a low temperature environment, the viscosity of lubricating oil for reducing the friction which coats the carriage sliding shaft deteriorates, or coefficients of thermal contraction are not matched due to a difference in the composition of the parts thereof, or paper particles, dust, and the like enter between the sliding shaft and the carriage, so that the friction load increases and the load torque of the motor is increased.

Actually, a load torque margin is provided so that the normal operation can be also executed even if the driving system changed. However, to provide a torque margin, it is necessary to use a motor which can output a larger generation torque or to reduce the load by using a reduction gear or the like. Thus, the number of parts increase, and the costs rise.

SUMMARY OF THE INVENTION

It is an object of the invention to solve the above problems and to provide a recording apparatus of a high reliability.

Another object of the invention is to enable the optimum driving state to be always obtained by changing an output torque characteristic in accordance with a motor load.

The above and other objects and features of the present invention will become apparent from the following detailed description and the appended claims with reference to the accompanying drawings.

DETAILED DESCRIPTION OF THE PREFERRED EMBODIMENTS

An embodiment of the present invention will be described in detail hereinbelow with reference to the drawings.

Figure 1:
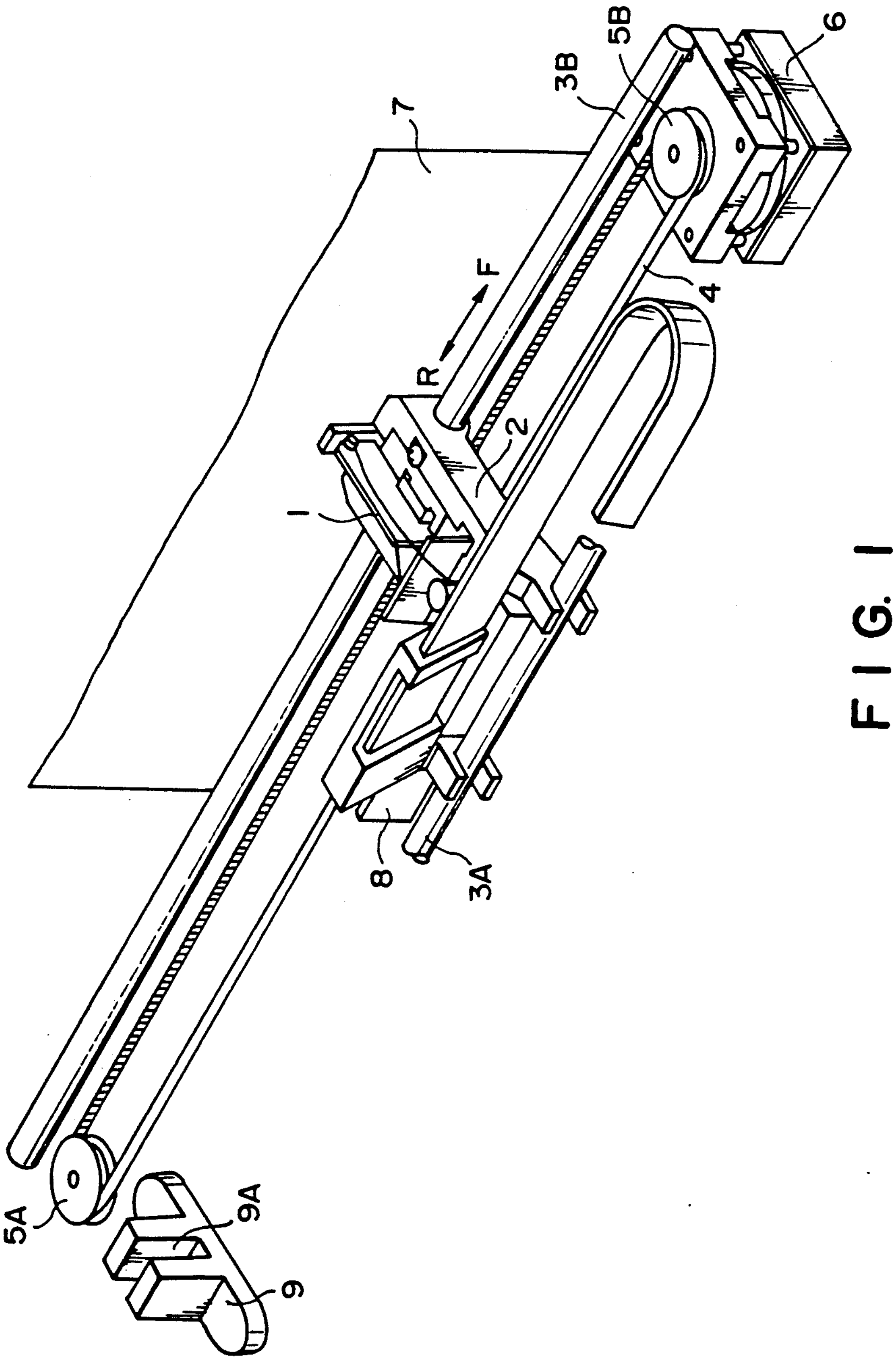
FIG. 1 is a perspective view of a carriage driving section of a recording apparatus according to an embodiment of the invention.

FIG. 1 shows a carriage driving mechanism. Reference numeral 1 denotes a recording head of, for example, the ink jet type; 2 denotes a carriage on which the recording head 1 is mounted and which moves along guide shafts 3A and 3B; 4 denotes a timing belt whose both ends are coupled to the carriage 2 and which is positioned between pulleys 5A and 5B; 6 denotes a carriage driving motor to drive the carriage 2 through the timing belt 4; and 7, denotes a recording sheet which is held at the opposite position of the recording head 1 by a platen or the like (not shown).

A shielding plate 8 is attached to the carriage 2. When the carriage 2 is moved in the R direction in FIG. 1, that is, to the left and arrives at the initial position, the shielding plate 8 is inserted into a slit 9A of a photo sensor 9. Thus, the position is detected and an encoder (not shown) attached coaxially with the carriage driving motor 6 is initialized as "0". As the carriage 2 is moved from the initial position in the F direction, namely, to the right, the position is successively detected by counting the signal from the encoder and, at the same time, recording is executed onto the recording sheet 7. On the other hand, after the carriage 2 is run by a distance corresponding to the recording of one line, the recording sheet 7 is fed by an amount corresponding to only one line by sheet feeding means (not shown).

An example of the driving conditions which are required for the carriage driving motor 1 in such a recording operation will now be explained. In the case of a recording density of 360 dots/inch, a rotational speed of the motor 1 corresponding to such a recording density is set to about 800 r.p.m. in the high speed mode and is set to about 400 r.p.m. in the low speed mode. Further, the time which is required from the start of the carriage until the arrival at a constant speed running (rotational speed: 800 r.p.m.) in the high speed mode is set to about 60 msec, a constant speed running time is set to about one second, and the time which is required from the constant speed run until the stop of the carriage is set to about 60 msec.

Figure 2A:
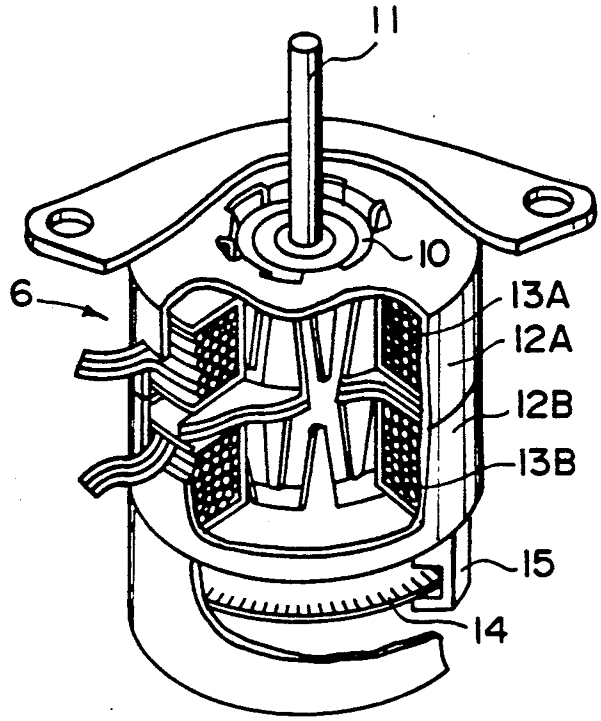
FIG. 2A is an internal constructional view of a motor shown in FIG. 1.
Figure 2B:
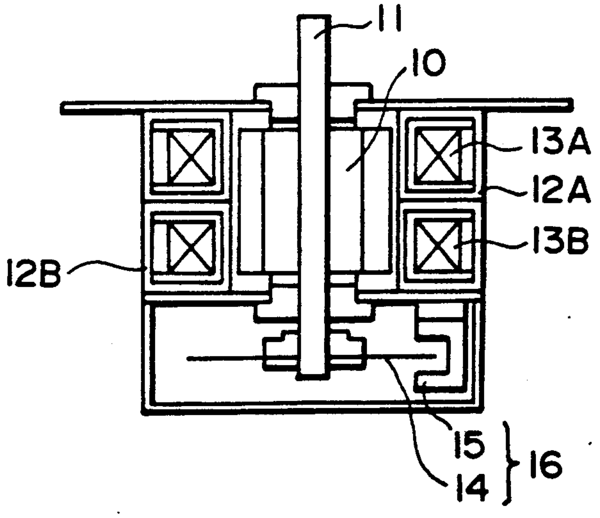
FIG. 2B is a cross sectional view of FIG. 2A.

FIGS. 2A and 2B show an example of a construction of the carriage driving motor 6 mentioned above. Reference numeral 10 denotes a rotor; 11 denotes a rotor shaft; 12A and 12B denote stators arranged around the rotor 10; and 13A and 13B denote coils. A detecting disk 14 of the encoder is attached coaxially to the rotor shaft 11. A photo interrupter 15 is attached on the stator side. Therefore, the rotational position of the motor 6 can be detected by counting output pulses from a rotary encoder 16 comprising the detecting disk 14 and the photo interrupter 15.

A motor drive control system to execute a closed loop control of the carriage driving motor 6 will now be described with reference to FIGS. 3 and 4.

Figure 3:
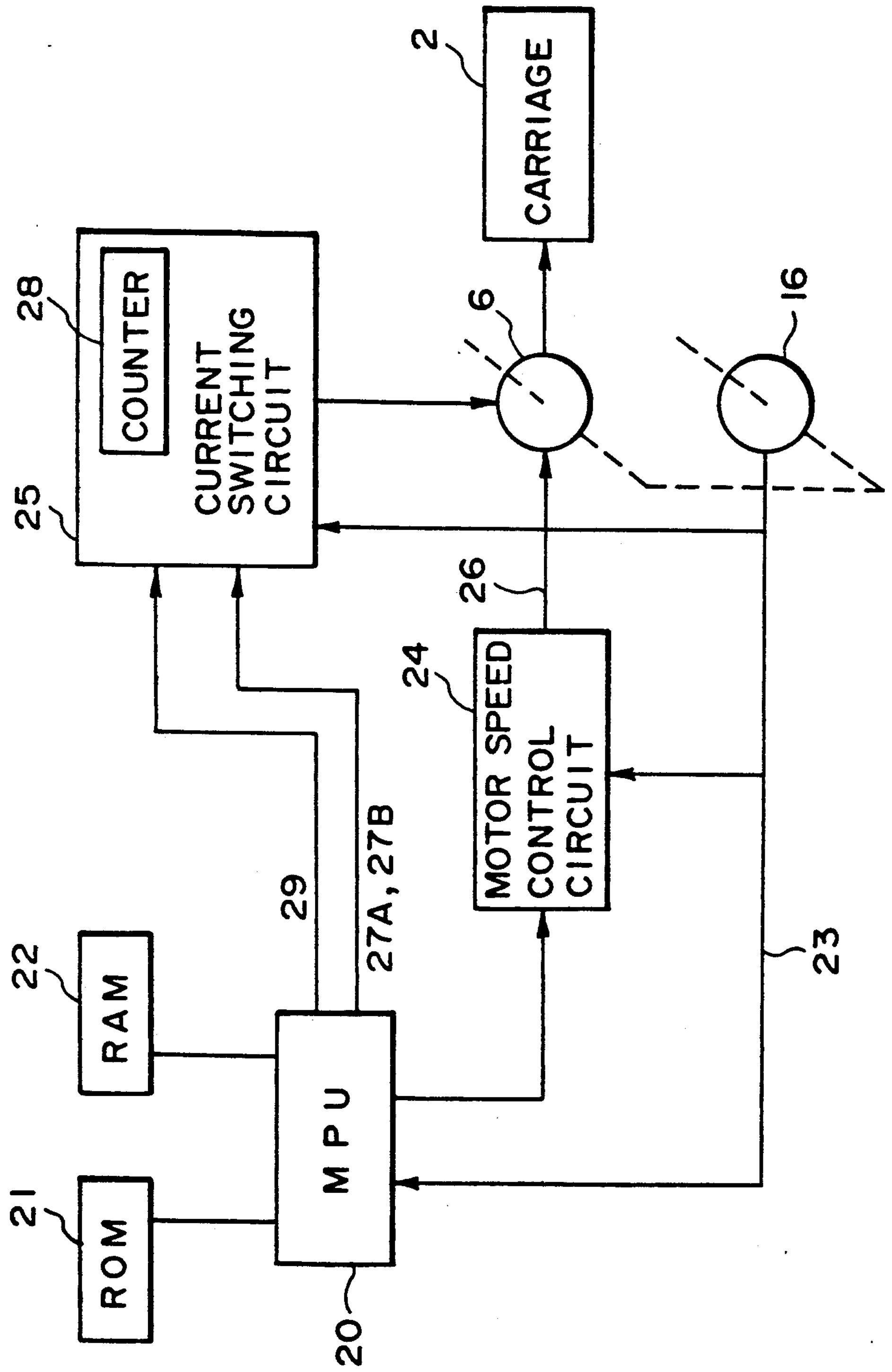
FIG. 3 is a circuit constructional diagram of a drive control system of the motor shown in FIG. 1.

In FIG. 3, reference numeral 20 denotes an MPU (microprocessor unit) to control the whole recording apparatus. In accordance with control programs stored in an ROM (read only memory) 21, the MPU 20 drives and controls driving sources of the other mechanisms (not shown) by using an RAM (random access memory) 22 for processing recording data and also controls the carriage driving motor 6 to drive the carriage 2. For this purpose, the MPU 20 has a counter constructed by hardware or software (not shown) and detects the position of the carriage 2 by counting output pulses 23 from the rotary encoder 16.

The MPU 20 controls the rotational speed of the carriage driving motor 6 to be at the foregoing speed in the high or low speed mode through a motor speed control circuit 24. The MPU 20 controls the start, stop, and rotating direction of the carriage driving motor 6 through a current switching circuit 25 for switching energization currents to the coils 13A and 13B of the motor 6, thereby starting, stopping, and moving the carriage 2.

On the other hand, the motor speed control circuit 24 closed-loop controls the rotational speed of the motor 6 in accordance with a detection output of the encoder 16. Practically speaking, a time interval between the output pulses 23 from the encoder 16 is compared with a preset reference time. In accordance with the result of the comparison, a control output 26 to the motor 6 is adjusted so as to eliminate the time difference.

When the MPU 20 instructs the rotational speed of the carriage driving motor 6 to the motor speed control circuit 24, the motor speed control circuit 24 selects the comparing reference time corresponding to the instructed speed in response to such a speed instruction and compares the reference time with the pulse interval, thereby controlling the rotational speed of the motor 6 to the speed in the high or low speed modes On the other hand, the current switching circuit 25 starts the switching operation of the energization currents by a start signal 27A which is input from the MPU 20, thereby starting the motor 6. On the other hand, the motor 6 is stopped by a stop signal 27B which is input from the MPU 20.

Further, as a point regarding the invention, the current switching circuit 25 controls the switching timing of the coil energization currents of the carriage driving motor 6 by a closed loop in response to the detection output of the encoder 16 in accordance with a procedure, which will be explained hereinlater, by the MPU 20. For this purpose, the current switching circuit 25 has a counter 28. The output pulses from the encoder 16 are counted by the counter 28 and the energization currents are switched at a point in time when the count value coincides with a predetermined value.

In the embodiment, since a stepping motor of double phases is used as a carriage driving motor 6 as shown in FIGS. 2A and 2B, the energization currents are switched 48 times per rotation of the rotor by a pattern of a single phase. On the other hand, the number of output pulses from the encoder 16 is set to 288 per rotation. Therefore, since the rotor 10 rotates by only an equal angle every progressing of one energization pattern, assuming that the rotational angle is set to one step, the number of pulses which are output from the encoder 16 every step is set to 288/48=6. Therefore, the rotor can be rotated at regular intervals if the energization currents are switched each time six output pulses from the encoder 16 are counted.

Figure 5A:
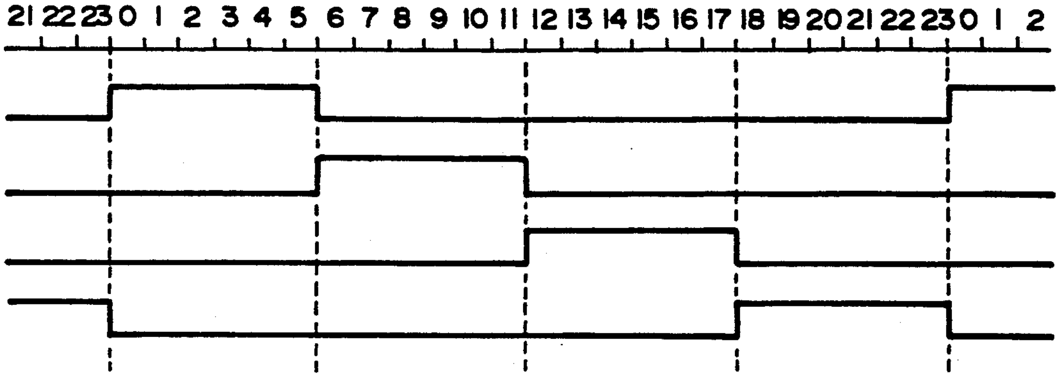
FIG. 5A is a waveform diagram of an ordinary control state of an energization switching signal in FIG. 4.

However, in this case, since the motor 6 is not rotated unless a predetermined relative positional relation is held between the magnetic pole of the rotor 10 and the magnetic poles of the stators 12A and 12B, it is necessary to match the relative positions between the magnetic pole of the rotor and the magnetic poles of the stators as an initial operation. Therefore, actually, in a state in which a predetermined phase was energized, the counter 28 in the current switching circuit 25 is reset to a predetermined numerical value. After that, the pulses from the encoder 16 are counted by the counter 28 and the energization currents are switched every other predetermined value (six pulses in the case of the embodiment). Consequently, when a relative positional relation was obtained between the magnetic pole of the rotor and the magnetic poles of the stators, the energization currents can be switched. For instance, in the case of a single phase energization, a ring counter which can count 24 pulses of one torque cycle, that is, four steps is used as a counter 28. Assuming that the count values for switching of the energization in this case are set to 6, 12, 18, and 0, energization waveforms as shown in FIG. 5A are obtained.

Subsequently, a control procedure for allowing the motor 6 to execute the optimum driving according to the load, which is a feature of the invention, will now be described in accordance with FIG. 4.

The portion surrounded by a broken line simplifies the control operation by the motor speed control circuit 24 described before. This portion shows that the rotational speed of the motor 6 is fed back and closed loop control is executed so that the difference between the actual rotational speed and the instructed speed from the MPU 20 is set to 0.

That is, in step S1, a check is made to see if the difference between the actual rotational speed and the instructed speed from the MPU 20 is 0 or not. If it is not 0, step S2 follows and a control output corresponding to the difference is calculated. In the next step S3, a check is made to see if the control output has exceeded an 80% output or not. If NO, step S4 follows and the motor 6 is driven by the control output. If it has exceeded the 80% output in step S3, the processing routine advances to step S5 and the energization switching value is changed and the processing routine is returned to step S1.

Figure 5B:
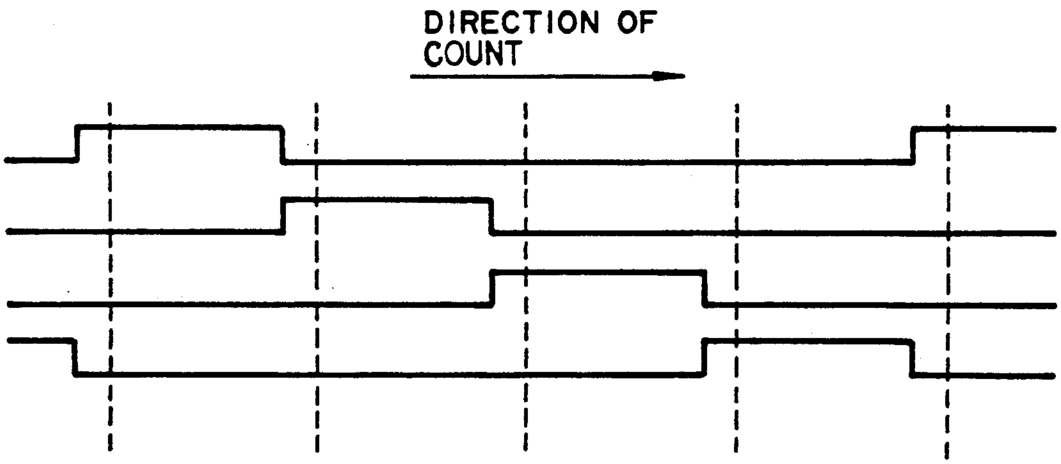
FIG. 5B is a waveform diagram in the case where the phase of the energization switching signal in FIG. 4 was shifted.
Figure 6:
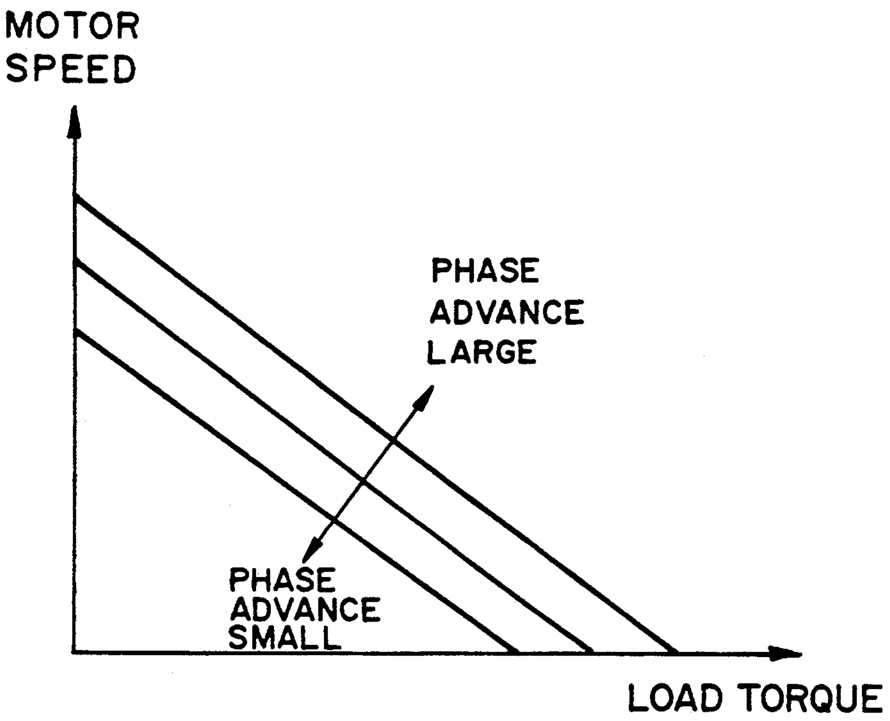
FIG. 6 is a torque characteristic graph of the motor in FIG. 1 in the case where the phase was shifted.

That is, in the MPU 20, the energization switching value of the counter 28 in the current switching circuit 28 is corrected by only 1 in a direction reverse to the direction of the count by a phase advance signal 29. When the count value of the counter 28 is increased, the energization waveforms are as shown in FIG. 5B. The phase of the energization current switching signal is advanced, so that a current can easily flow in the winding. FIG. 6 shows a change in output torque of the motor in the case where the phase of the energization signal was advanced. As will be understood from FIG. 6, since the output torque of the motor 6 increases as the switching phase is advanced, the motor 6 can be also controlled to a predetermined speed even for a load in a wide range. Therefore, even in the case where the load torque increases and the output becomes maximum and exceeds the speed control limit, by advancing the phase, the output torque can be raised and the speed control can be properly executed. A situation such that when the control output arrived at 100%, the motor becomes uncontrollable as in the conventional apparatus does not occur.

Figure 7:
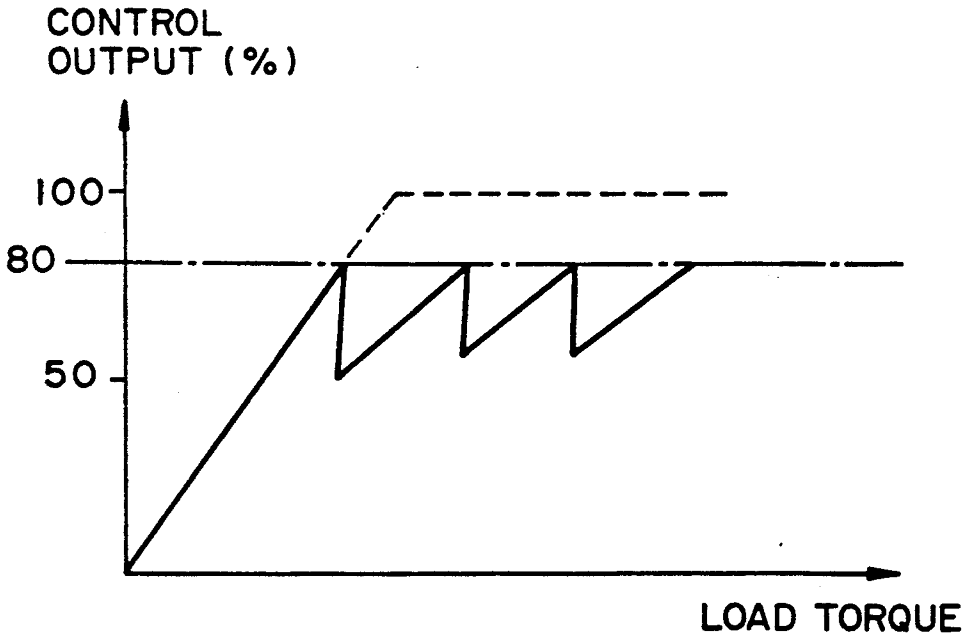
FIG. 7 is a characteristic graph showing a change in control output according to the first embodiment.

FIG. 7 shows the relation between the load torque and the output of the control circuit. In a conventional control, the control output also increases in proportion to an increase in load torque and, finally, the control output is saturated as shown by a broken line. However, in the embodiment, when the control output has reached a predetermined value (80% of the maximum output in the embodiment), the phase for energization switching is advanced, so that the output value is suppressed to a low value as shown by a solid line and, thereafter, the output value similarly increases in proportion to the load. However, by repeating the advance of the phase each time the output value has reached 80%, the output can be controlled to a predetermined value or less.

On the other hand, by suppressing the output to a low value at the same load, there are obtained effects such that the electric power consumption of the motor 6 can be suppressed and the heat generation of a motor driver IC can be suppressed.

In the embodiment, the reason why the output characteristics of the motor 6 have been switched in accordance with the load of the motor 6 (also relating to a load degree of the motor speed control circuit 24) is because the optimum values of the various constants (for instance, loop gain and phase) for the speed control differ depending on the output of the motor and the load state. However, in the case of changing the output of the motor in the high load state as mentioned above, there is no fear of overshooting or hatching due to mismatching of the control constants.

The second embodiment of the invention will now be described.

Figure 8:
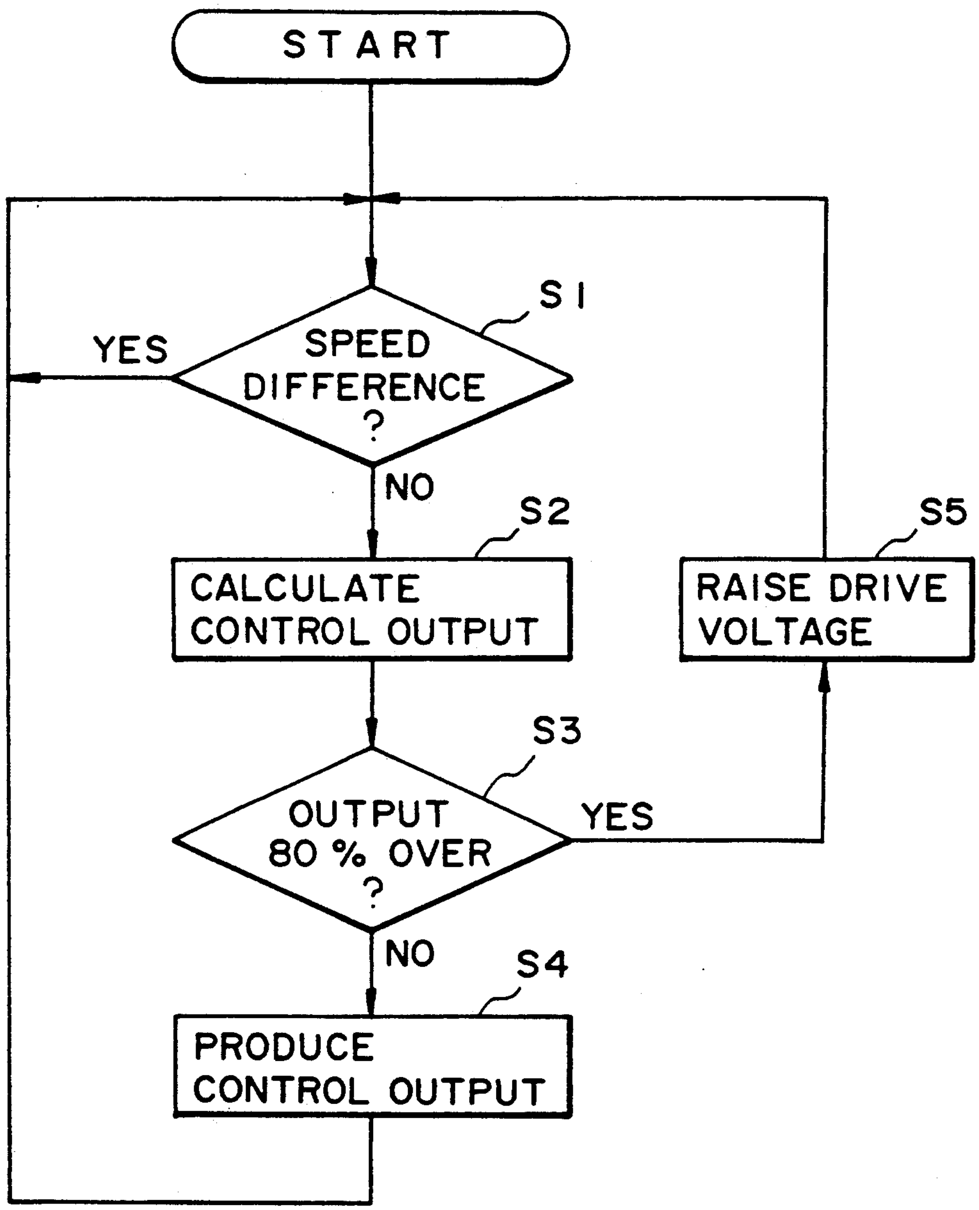
FIG. 8 is a flowchart showing a procedure of the control operation according to the second embodiment of the invention.

In a manner similar to the first embodiment, even in the second embodiment, the control output value for the load of the motor 6 is also likewise traced and examined. However, if the control output value has exceeded a certain limit value (for instance, 80% of the maximum output), the power source voltage is increased. A control procedure in the above case is shown in FIG. 8.

The power source voltage in such a case can be switched by a transistor or the like (not shown).

Figure 4:
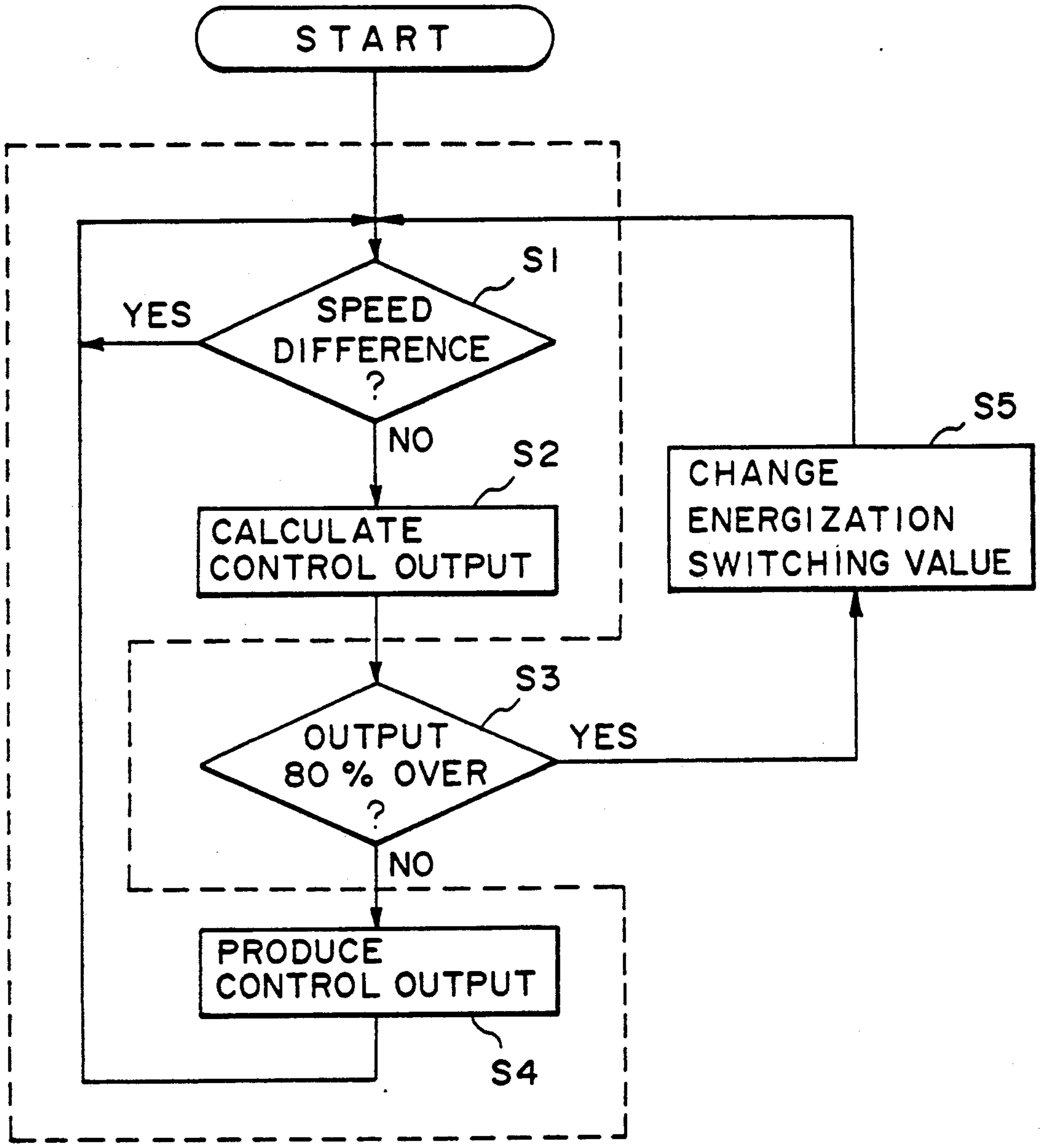
FIG. 4 is a flowchart for the circuit shown in FIG. 3.

Since the procedure for the control operation from step S1 to step S4 is similar to that in the case of FIG. 4, its description is omitted. If the control output has exceeded the 80% output in step S3, the processing routine advances to step S5 and the driving power source is raised as mentioned above. Then, the processing routine is returned to step S1.

Figure 9:
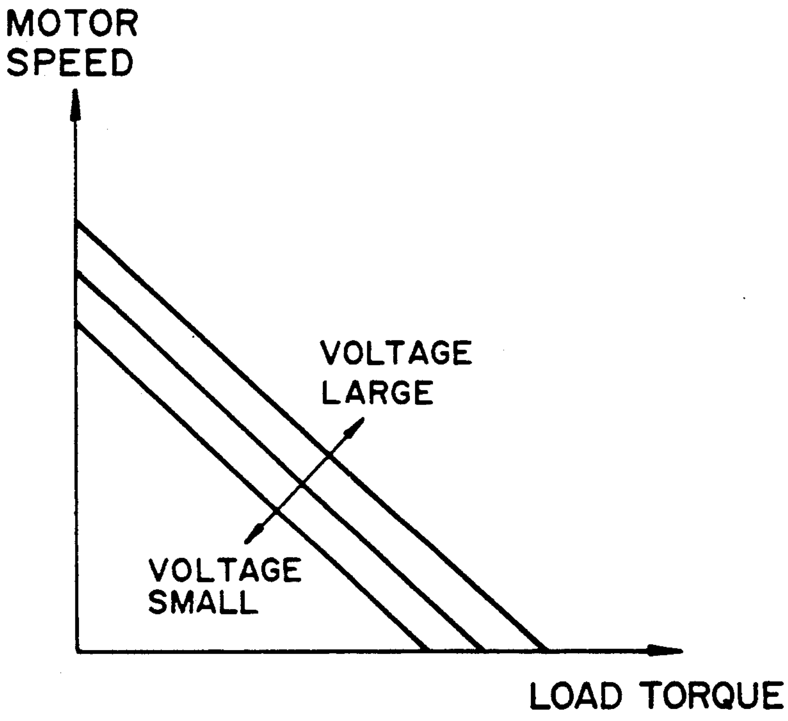
FIG. 9 is a torque characteristic graph of the motor in the case where a motor driving voltage was changed in accordance with FIG. 8.

That is, in the case where the power source voltage was changed, the output torque of the motor changes as shown in FIG. 9. Therefore, as will be obvious from FIG. 9, by raising the supply voltage, the output torque can be raised and the speed control range can be widened.

In the embodiment, since the reason why the motor 6 is not driven by a high supply voltage from the beginning is similar to that mentioned in the first embodiment, its description is omitted.

As described above, according to the invention, it is possible to provide a recording apparatus in which the carriage driving motor is closed-loop controlled so as to optimize the output torque of the motor in accordance with a change in load of the motor, a stable control of a high reliability can be connected, and the high speed recording of a low noise can be executed.

We claim:

1. A recording apparatus for executing a movement for recording and scanning of a recording head, comprising:

a carriage on which the recording head is mounted;

a stepping motor for moving said carriage;

detecting means for detecting a rotational angle position of a rotor of said stepping motor and for generating a pulse signal every rotation of a predetermined angle of the rotor;

control means for counting the pulse signals from said detecting means, for detecting the position of said carriage in accordance with a count value, and for outputting control signals of a start, a stop, and a speed of the carriage and a phase changing signal;

current switching means for counting the pulse signals from said detecting means and for switching and controlling energization currents which are supplied to coils of said stepping motor in accordance with a count value, in which said current switching means starts the switching control of the energization currents by the start control signal from said control means, stops the switching control of the energization currents by the stop control signal, and wherein the time at which the energization current is changed is advanced by the phase changing signal, thereby changing the output torque of said stepping motor; and speed control means for controlling an output to said stepping motor in accordance with a time interval between the pulse signals from said detecting means, in which said speed control means compares the time interval between the pulse signals from said detecting means and a reference time by the speed control signal from said control means and calculates the control output in accordance with the result of the comparison, and when the calculated control output value exceeds a predetermined level, said speed control means allows said control means to generate the phase changing signal.

2. An apparatus according to claim 1, wherein said current switching means corrects the energization switching value in a direction reverse with respect to the direction of calculation by the phase change signal.

3. A recording apparatus for executing a movement for recording and scanning of a recording head, comprising:

a carriage on which the recording head is mounted;

a stepping motor to move said carriage;

detecting means for detecting a rotational angle position of a rotor of said stepping motor and for generating a pulse signal every rotation of a predetermined angle of the rotor;

speed control means for controlling an output to said stepping motor in accordance with a time interval between the pulse signals from said detecting means;

control means for generating a load change signal when the control output of said speed control means exceeds a predetermined level; and current switching means for counting the pulse signals from said detecting means and for switching and controlling energization currents which are supplied to coils of said stepping motor in accordance with a count value, and wherein the time at which the energization current is changed is advanced by the load change signal, thereby changing the output torque of said stepping motor.

4. An apparatus according to claim 3, wherein the load change signal is a voltage change signal and a driving voltage of said stepping motor is changed by the voltage change signal, thereby changing the output torque of said stepping motor.

5. An apparatus according to claim 3, wherein the load change signal is a phase change signal and a phase of the energization current switching value is advanced by the phase change signal, thereby changing the output torque of the stepping motor.

* * * * *

UNITED STATES PATENT AND TRADEMARK OFFICE
CERTIFICATE OF CORRECTION

PATENT NO. : 5,097,189

DATED : March 17, 1992

INVENTOR(S) : Noriaki ITO, et al.

It is certified that error appears in the above-identified patent and that said Letters Patent is hereby corrected as shown below:

Title page,

Insert:

--[30] Foreign Application Priority Data

July 18, 1989 [JP] Japan ............... 1-183742--.

<u>COLUMN 3</u>:

Line 54, "7," should read --7--.

<u>COLUMN 4</u>:

Line 68, "modes" should read --modes.--.

<u>COLUMN 7</u>:

Line 37, "signal" should read --signal at--.

Signed and Sealed this

Thirteenth Day of July, 1993

*Attest:*

Michael K. Kirk

MICHAEL K. KIRK

*Attesting Officer*

*Acting Commissioner of Patents and Trademarks*